US011293367B2

United States Patent
Sekiguchi et al.

(10) Patent No.: US 11,293,367 B2
(45) Date of Patent: Apr. 5, 2022

(54) FAILURE DETERMINATION DEVICE FOR INTERNAL COMBUSTION ENGINE

(71) Applicant: HONDA MOTOR CO., LTD., Tokyo (JP)

(72) Inventors: Toru Sekiguchi, Wako (JP); Takashi Konomoto, Wako (JP); Taku Hirota, Wako (JP); Hiroki Ishikawa, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/202,565

(22) Filed: Mar. 16, 2021

(65) Prior Publication Data

US 2021/0293196 A1 Sep. 23, 2021

(30) Foreign Application Priority Data

Mar. 19, 2020 (JP) .............................. JP2020-048713

(51) Int. Cl.
 *F02D 41/22* (2006.01)
(52) U.S. Cl.
 CPC ...... *F02D 41/22* (2013.01); *F02D 2200/0406* (2013.01); *F02D 2200/703* (2013.01)
(58) Field of Classification Search
 CPC ............. F02D 41/22; F02D 41/0007; F02D 2200/0406; F02D 2200/703; F02D 2250/08; F02D 2041/227
 See application file for complete search history.

(56) References Cited

U.S. PATENT DOCUMENTS

| | | | |
|---|---|---|---|
| 10,767,590 B1* | 9/2020 | Jentz | G07C 5/0808 |
| 2014/0081548 A1* | 3/2014 | Pursifull | F02M 25/06 |
| | | | 701/101 |
| 2017/0175662 A1* | 6/2017 | Yoshioka | F02D 41/22 |
| 2019/0072059 A1* | 3/2019 | Sekiguchi | F02M 35/10157 |
| 2020/0040782 A1* | 2/2020 | Dunn | F01M 13/0405 |
| 2020/0400050 A1* | 12/2020 | Jentz | F01M 13/00 |

FOREIGN PATENT DOCUMENTS

JP 2015-137547 A 7/2015

* cited by examiner

*Primary Examiner* — George C Jin
(74) *Attorney, Agent, or Firm* — Westerman, Hattori, Daniels & Adrian, LLP (57) ABSTRACT

In a failure determination device for an internal combustion engine equipped with a supercharger, the failure determination device determining a failure of a breather pipe that is connected between a crankcase and an intake passage at a position on an upstream side of the supercharger, the breather pipe is constituted by a double pipe including an inner pipe and an outer pipe, a communication passage communicates an enclosed space between the inner pipe and the outer pipe of the breather pipe with a portion of the intake passage on a downstream side of the supercharger. When the detected breather outer-pipe gauge pressure is higher than or equal to a determination threshold that is set in accordance with detected intake gauge pressure, the failure determination device determines that the breather pipe is failed.

12 Claims, 10 Drawing Sheets

FAILURE DETERMINATION DEVICE FOR INTERNAL COMBUSTION ENGINE

CROSS REFERENCES TO RELATED APPLICATIONS

The present application claims priority under 35 U.S.C. § 119 to Japanese Patent Application No. 2020-048713, filed Mar. 19, 2020, entitled "Failure Determination Device For Internal Combustion Engine." The contents of this application are incorporated herein by reference in their entirety.

TECHNICAL FIELD

The present disclosure relates to a failure determination device equipped in an internal combustion engine to determine a failure caused by disconnection or damage of, for example, a breather pipe or the like connected between a crankcase of an internal combustion engine and an upstream side of a compressor in an intake passage.

BACKGROUND

Generally, various types of tubing pipes are disposed in an internal combustion engine. For example, a PCV (positive crankcase ventilation) pipe and a breather pipe are disposed to communicate a crankcase of the internal combustion engine and an exhaust system with each other, thereby causing blow-by gas having leaked from a combustion chamber into the crankcase to flow into an intake system.

Figure 11:
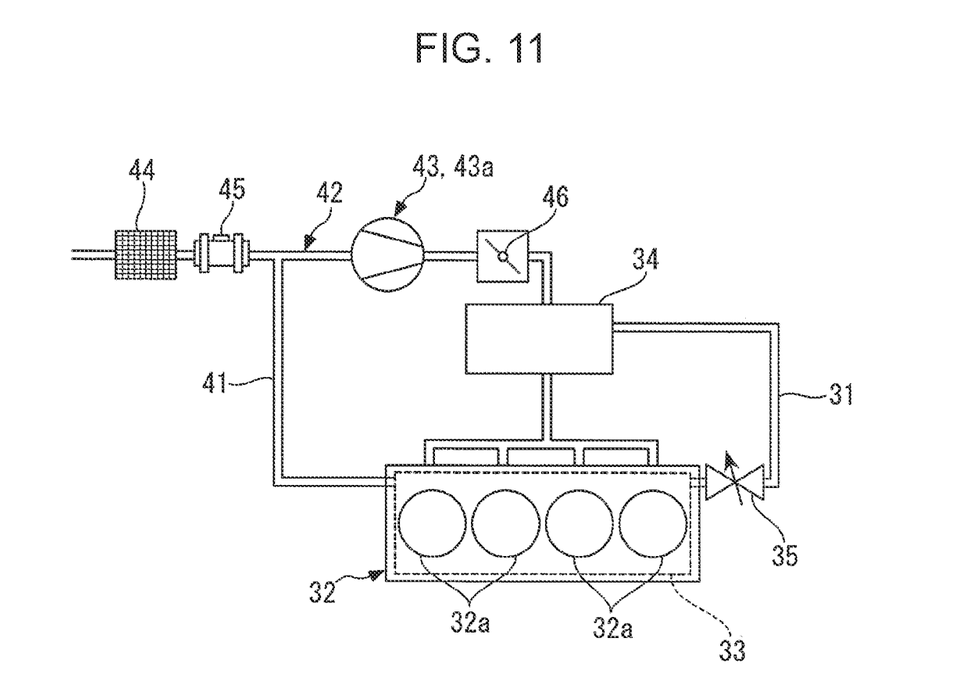
FIG. 11 is an explanatory view representing a PCV pipe and a breather pipe each communicating a crankcase and an intake system in an internal combustion engine of related art.

FIG. 11 schematically illustrates an engine in which a PCV pipe and a breather pipe are disposed, and which is equipped with a supercharger. As illustrated in FIG. 11, the PCV pipe 31 is connected between a crankcase 33 of the engine 32 and an intake manifold 34. With negative pressure generated in the intake manifold 34 during operation of the engine 32, a PCV valve 35 including a check valve is opened and blow-by gas inside the crankcase 33 is sucked into the intake manifold 34. The sucked blow-by gas is burned in each cylinder 32a.

On the other hand, the breather pipe 41 is connected between the crankcase 33 and an intake passage 42 at a position on an upstream side (left side in FIG. 11) of a compressor 43a of the supercharger 43. Furthermore, an air cleaner 44 and an air flow meter 45 are disposed in the intake passage 42 on an upstream side of a junction point with the breather pipe 41, and a throttle valve 46 is disposed between the compressor 43a and the intake manifold 34. In the breather pipe 41, air flows from the intake passage 42 toward the crankcase 33 when the engine 32 naturally takes in air. However, when the engine 32 is supercharged, the blow-by gas in the crankcase 33 flows from the crankcase 33 toward the intake passage 42 due to suction caused by negative pressure in the compressor 43.

The breather pipe 41 is required to be tightly and appropriately attached to at its both ends to the crankcase 33 and the intake passage 42 such that the breather pipe 41 is connected between the crankcase 33 and the intake passage 42 in an airtight state. However, there is a possibility that the breather pipe 41 may fail due to disconnection of the breather pipe 41 from the intake passage 42 or the crankcase 33, or generation of a hole in the breather pipe 41. A failure determination device disclosed in Japanese Unexamined Patent Application Publication No. 2015-137547 is known as a device for determining the above-mentioned failure.

According to the disclosed failure determination device, an air-fuel ratio of an air-fuel mixture is detected by an air-fuel ratio sensor disposed in an exhaust passage, and a fuel correction amount representing a deviation relative to an appropriate fuel injection amount is calculated. The occurrence of a failure of the breather pipe 41 and so on is determined if the sum of the fuel correction amount in a supercharged state and the fuel correction amount in a not-supercharged state is larger than or equal to a predetermined value.

SUMMARY

The above-described failure determination device determines the failure of the breather pipe 41 based on the fuel correction amount corresponding to change of the air-fuel ratio, the change being caused by inflow of outside air into the intake passage or outflow of intake air from the intake passage when the breather pipe 41 is failed. However, when a degree of the failure is relatively small and an amount of air flowing into or out of the breather pipe 41 is small, the failure of the breather pipe 41 cannot be appropriately determined in some cases. Furthermore, because the failure of the breather pipe 41 is determined based on the sum of the fuel correction amount in the supercharged state and the fuel correction amount in the not-supercharged state, the above-described failure determination device further accompanies with a problem that, when the failure of the breather pipe 41 has occurred in one of the supercharged state and the not-supercharged state, the occurrence of the failure cannot be determined until the state is changed to the other of the supercharged state and the not-supercharged state.

It is desirable to solve the above-mentioned problems and to provide a failure determination device for an internal combustion engine, which can appropriately and quickly determine a failure of a tubing pipe such as a breather pipe.

According to a first aspect of the present disclosure, there is provided a failure determination device for an internal combustion engine equipped with a supercharger, the failure determination device determining a failure of a breather pipe that is connected between a crankcase and an intake passage at a position on an upstream side of the supercharger and that communicates the crankcase and the intake passage with each other, wherein the breather pipe is constituted by a double pipe including an inner pipe that communicates the crankcase and the intake passage with each other, and an outer pipe that is arranged around the inner pipe with a predetermined spacing held therebetween and that defines an enclosed space between the inner pipe and the outer pipe, and wherein the failure determination device includes a communication passage that communicates the enclosed space in the breather pipe and a portion of the intake passage on a downstream side of the supercharger with each other, a breather outer-pipe pressure detection unit (outer-pipe pressure sensor in an embodiment described below; this latter note also applies to wordings in the following parentheses) that detects, as breather outer-pipe pressure PDA, pressure in the enclosed space in the breather pipe, an intake pressure detection unit (intake pressure sensor) that detects, as intake pressure PBA, pressure in the intake passage on the downstream side of the supercharger, a determination threshold setting unit (ECU) that sets, in accordance with the detected intake pressure, a determination threshold used to determine whether a failure has occurred, and a failure determination unit that determines that the breather pipe is failed, when the detected breather outer-pipe pressure is higher than or equal to the determination threshold.

With the above-described feature, the breather pipe is connected between the crankcase and the intake passage o at the position on the upstream side of the supercharger and communicates the crankcase and the intake passage with each other. When the internal combustion engine is operated with natural air intake, part of intake air flows from the intake passage side toward the crankcase side through the breather pipe. On the other hand, when the internal combustion engine is under supercharged operation, blow-by gas in the crankcase flows from the crankcase side toward the intake passage side through the breather pipe due to negative pressure caused by a compressor of the supercharger. The breather pipe is constituted by the double pipe including the inner pipe that communicates the crankcase and the intake passage with each other, and an outer pipe that is arranged around the inner pipe with a predetermined spacing held therebetween. The enclosed space is defined between the inner pipe and the outer pipe. Furthermore, the enclosed space in the breather pipe and the portion of the intake passage on the downstream side of the supercharger are communicated with each other by the communication passage. In addition, the pressure in the enclosed space in the breather pipe is detected, as the breather outer-pipe pressure, by the breather outer-pipe pressure detection unit, while the pressure in the intake passage on the downstream side of the supercharger is detected, as the intake pressure, by the intake pressure detection unit detects.

Because the enclosed space in the breather pipe and the portion of the intake passage on the downstream side of the supercharger are communicated with each other by the communication passage as described above, pressures at both end sides of the communication passage, namely the breather outer-pipe pressure and the intake pressure, take substantially equal values in a normal state in which the breather pipe is appropriately connected between the crankcase and the intake passage at the position on the upstream side of the supercharger.

However, in case of a failure, for example, if the breather pipe is disconnected from the crankcase or the intake passage or if it is damaged with generation of a hole, the breather outer-pipe pressure takes a value equal to or close to atmospheric pressure. Moreover, the value of the breather outer-pipe pressure changes depending on, for example, a size of the hole generated in the damaged breather pipe. Thus, as the hole size increases, a degree of damage increases, and the breather outer-pipe pressure takes a value closer to the atmospheric pressure. On the other hand, as the hole size reduces, a degree of damage reduces, and the breather outer-pipe pressure takes a value closer to the intake pressure.

In a graph with a horizontal axis and a vertical axis representing respectively the intake pressure and the breather outer-pipe pressure, therefore, when the breather pipe is normal, the intake pressure and the breather outer-pipe pressure at the same detection timing are plotted on or around a straight line sloping upward to the right (referred to as a "sloped line" here), which is obtained by connecting points where the intake pressure and the breather outer-pipe pressure take the same value. Furthermore, in the above graph, when the breather pipe is severely failed and the breather outer-pipe pressure becomes equal to the atmospheric pressure, the intake pressure and the breather outer-pipe pressure at the same detection timing are plotted on a horizontal straight line (referred to as a "horizontal line" here) indicating that the breather outer-pipe pressure takes the same value as the atmospheric pressure regardless of the value of the intake pressure.

Moreover, in the above graph, when a degree of the failure of the breather pipe is smaller than in the above-described severe case, the intake pressure and the breather outer-pipe pressure at the same detection timing are plotted at positions displaced toward the above-mentioned sloped line in the normal state from the above-mentioned horizontal line. Therefore, a straight line passing an intersection between the sloped line and the horizontal line and sloping upward to the right (referred to as a "threshold line" here) can be set between the sloped line and the horizontal line as a line indicating a threshold used to determine whether the failure of the breather pipe has occurred. Accordingly, a threshold for determining the occurrence of the failure in accordance with the detected intake pressure can be obtained with the aid of the threshold line. When the detected breather outer-pipe pressure is higher or equal to the determination threshold, it can be determined that the breather pipe is failed. Thus, with the present disclosure, the failure of the breather pipe can be appropriately and quickly determined by using the intake pressure and the breather outer-pipe pressure at the same detection timing and by comparing the breather outer-pipe pressure with the determination threshold.

According to a second aspect of the present disclosure, in the failure determination device for the internal combustion engine according to the first aspect, the failure determination unit executes failure determination of the breather pipe when the detected intake pressure is lower than or equal to a predetermined value (upper limit value UPLIM) (PBGA UPLIM).

With the above-described feature, since the failure determination of the breather pipe is executed when the detected intake pressure is lower than or equal to the predetermined value, it is possible to effectively prevent false determination that may be caused by variations in detection of the intake pressure and the breather outer-pipe pressure.

According to a third aspect of the present disclosure, the failure determination device for the internal combustion engine according to the first or second aspect further includes an atmospheric pressure detection unit (atmospheric pressure sensor) that detects atmospheric pressure, and the determination threshold setting unit sets the determination threshold (threshold PDGATH) in accordance with a relation (intake gauge pressure PBGA=PBA−PA) between the detected intake pressure PBA and the detected atmospheric pressure PA.

With the above-described feature, since the determination threshold is set by the determination threshold setting unit in accordance with the relation between the detected intake pressure and the detected atmospheric pressure, the false determination can be suppressed in comparison with the case of setting the determination threshold in accordance with only the intake pressure.

According to a fourth aspect of the present disclosure, in the failure determination device for the internal combustion engine according to the third aspect, the determination threshold setting unit sets, as a determination threshold for gauge pressure (threshold PDGATH), the determination threshold in accordance with intake gauge pressure PBGA resulting from subtracting the detected atmospheric pressure PA from the detected intake pressure PBA, and the failure determination unit determines that the breather pipe is failed, when breather outer-pipe gauge pressure PDGA resulting from subtracting the detected atmospheric pressure PA from the detected breather outer-pipe pressure PDA is higher than or equal to the determination threshold for gauge pressure (PDGA≥PDGATH).

With the above-described feature, the determination threshold is set, as the determination threshold for gauge pressure, in accordance with the intake gauge pressure resulting from subtracting the detected atmospheric pressure from the detected intake pressure. The breather pipe is then determined to be failed when the breather outer-pipe gauge pressure resulting from subtracting the atmospheric pressure from the detected atmospheric pressure is higher than or equal to the determination threshold for gauge pressure. Thus, in a process for the failure determination of the breather pipe, the failure determination is performed by using the breather outer-pipe gauge pressure, which is pressure on the basis of the atmospheric pressure, and the determination threshold for gauge pressure. As a result, even when the atmospheric pressure is changed, the failure determination of the breather pipe can be appropriately performed without being affected by the change of the atmospheric pressure.

According to a fifth aspect of the present disclosure, there is provided a failure determination device for an internal combustion engine, the failure determination device determining a failure of a predetermined pipe (breather pipe) disposed in the internal combustion engine and communicating a first location (crankcase) and a second location (intake passage) that are to be held in communication with each other, wherein the pipe is constituted by a double pipe including an inner pipe that communicates the first location and the second location with each other, and an outer pipe that is arranged around the inner pipe with a predetermined spacing held therebetween and that defines an enclosed space between the inner pipe and the outer pipe, and the failure determination device includes a communication passage that communicates the enclosed space in the pipe and a portion of the intake passage on a downstream side of a throttle valve with each other, an outer-pipe pressure detection unit (outer-pipe pressure sensor) that detects, as outer pipe pressure (breather outer-pipe pressure PDA), pressure in the enclosed space in the pipe, an intake pressure detection unit (intake pressure sensor) that detects, as intake pressure PBA, pressure in the intake passage on the downstream side of the throttle valve, a determination threshold setting unit that sets, in accordance with the detected intake pressure, a determination threshold (threshold DGATH) used to determine whether a failure has occurred, and a failure determination unit that determines that the pipe is failed, when the detected outer pipe pressure is higher than or equal to the determination threshold (PDGA PDGATH).

With the above-described feature, the failure determination is performed on a predetermined pipe that is disposed in the internal combustion engine and that is the same as or similar to the breather pipe in the above-mentioned first aspect. The predetermined pipe is constituted by the double pipe including the inner pipe and the outer pipe as in the above-described breather pipe. The inner pipe communicates the first location and the second location that are to be held in communication with each other, and the enclosed space is defined between the inner pipe and the outer pipe. The enclosed space in the pipe and the portion of the intake passage on the downstream side of the throttle valve are communicated with each other by the communication passage. The pressure in the enclosed space in the pipe is detected as the outer pipe pressure by the outer pipe pressure detection unit, while the pressure in the intake passage on the downstream side of the throttle valve is detected as the intake pressure by the intake pressure detection unit. Also in the case of using such a pipe, based on a similar principle to that explained in connection with the above-mentioned first aspect, the occurrence of the failure of the pipe can be determined when the detected outer pipe pressure is higher than or equal to the determination threshold that is set in accordance with the intake pressure. Thus, according to the fifth aspect of the present disclosure, as with the above-mentioned first aspect, the failure of the pipe can be appropriately and quickly determined by using the intake pressure and the outer pipe pressure at the same detection timing and by comparing the outer pipe pressure with the determination threshold.

According to a sixth aspect of the present disclosure, in the failure determination device for the internal combustion engine according to the first aspect, the communication passage communicates the enclosed space in the breather pipe and a portion of the intake passage on a downstream side of a throttle valve with each other, and the intake pressure detection unit detects, as the intake pressure, pressure in the intake passage on the downstream side of the throttle valve.

With the above-described feature, the enclosed space in the breather pipe and the portion of the intake passage on the downstream side of the throttle valve are communicated with each other by the communication passage, and the pressure in the intake passage on the downstream side of the throttle valve is detected as the intake pressure. Therefore, the failure determination of the breather pipe can be appropriately and quickly performed by using the intake pressure and the breather outer-pipe pressure that are negative pressures.

According to a seventh aspect of the present disclosure, in the failure determination device for the internal combustion engine according to the sixth aspect, a check valve is disposed at a junction (second connection opening) between the communication passage and the portion of the intake passage on the downstream side of the throttle valve.

With the above-described feature, since the check valve is disposed at the above-mentioned junction, negative pressure generated in the intake passage on the downstream side of the throttle valve can be avoided from acting on sealing members for the communication passage and the breather pipe. It is hence possible to suppress the component performance demanded for the sealing members, to use relatively inexpensive sealing members, and to reduce the cost.

According to an eighth aspect of the present disclosure, in the failure determination device for the internal combustion engine according to any one of the first to seventh aspects, a passage area of the communication passage is set to be smaller than a predetermined size in accordance with which occurrence of the failure is to be determined.

With the above-described feature, the passage area of the communication passage is set to be smaller than the predetermined size in accordance with which the occurrence of the failure is to be determined. Therefore, when a hole with a larger size than the above-mentioned predetermined size is generated in the breather pipe, a larger pressure difference is caused is the detected breather outer-pipe relative to the pressure detected in the normal state. As a result, the failure of the breather pipe can be detected with higher accuracy based on the larger pressure difference. In the above explanation of the exemplary embodiment, specific elements with/without their reference numerals are indicated by using brackets. These specific elements are presented as mere examples in order to facilitate understanding, and thus, should not be interpreted as any limitation to the accompanying claims.

BRIEF DESCRIPTION OF THE DRAWINGS

The advantages of the disclosure will become apparent in the following description taken in conjunction with the following drawings.

FIGS. 3A and 3B are explanatory views representing a relation between intake pressure and breather outer-pipe pressure; specifically.

FIGS. 4A and 4B illustrate, in an enlarged scale, a state in which the breather pipe illustrated in FIG. 1 is failed due to generation of a hole; specifically.

FIGS. 5A and 5B are each an explanatory view representing a failure determination map based on the relation between the intake pressure and the breather outer-pipe pressure; specifically, FIG. 5B represents the failure determination map.

FIGS. 6A and 6B are explanatory views representing the relation between the intake pressure and the breather outer-pipe pressure depending on difference in altitude; specifically.

DESCRIPTION OF THE PREFERRED EMBODIMENTS

Figure 1:
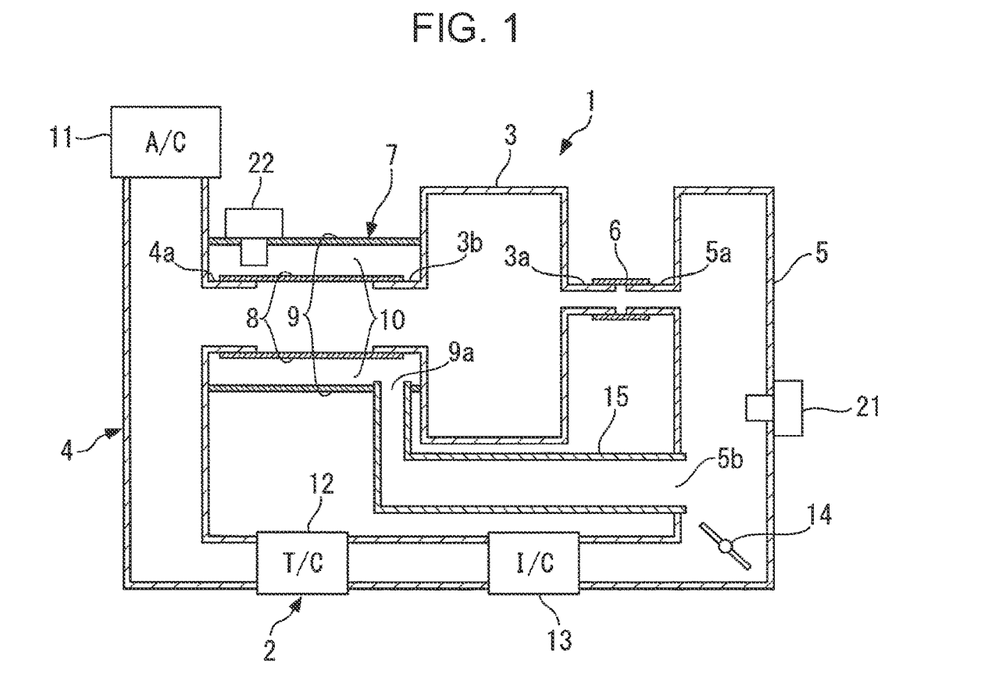
FIG. 1 schematically illustrates an internal combustion engine and various types of tubing pipes to which a failure determination device according to an embodiment of the present disclosure is applied.

A preferred embodiment of the present disclosure will be described in detail below with reference to the drawings. FIG. 1 schematically illustrates an internal combustion engine and various types of tubing pipes to which a failure determination device according to an embodiment of the present disclosure is applied. The internal combustion engine (hereinafter referred to as an "engine") 1 is a gasoline engine mounted as a motive power source on a four-wheel vehicle (not illustrated) and includes, for example, four cylinders (not illustrated). As illustrated in FIG. 1, the engine 1 is equipped with a supercharger 2. A PCV pipe 6 and a breather pipe 7 are connected between an intake passage 4 and a crankcase 3 disposed in a lower portion of a main body of the engine 1.

An air cleaner 11, a compressor 12 of the supercharger 2, an intercooler 13, and a throttle valve 14 are successively disposed in the intake passage 4 in the mentioned order from an upstream side. The air cleaner 11 cleans outside air and introduces the air into the intake passage 4. The compressor 12 is rotated together with rotation of a turbine (not illustrated), which is disposed on an exhaust passage side, to pressurize the introduced air (hereinafter referred to as the "intake air") for delivery to the cylinders in the engine main body. The intercooler 13 cools the intake air at temperature having risen with the pressurization. The throttle valve 14 is rotated in link with an accelerator pedal (not illustrated) and adjusts an intake amount.

An intake manifold 5 is disposed in the intake passage 4 on a downstream side of the throttle valve 14. The intake manifold 5 has branch pipes in the same number as the cylinders and distribute the intake air to the individual cylinders.

The PCV pipe 6 is disposed to connect a first opening 3a formed in the crankcase 3 at a predetermined position and a first connection opening 5a formed in the intake manifold 5 at a predetermined position, thus communicating the crankcase 3 and the intake manifold 5 with each other. Although not illustrated, a PCV valve similar to the PCV valve 35 disposed in the PCV pipe 31 in FIG. 11, described above, is disposed in the PCV pipe 6.

On the other hand, the breather pipe 7 is disposed to connect a second opening 3b formed in the crankcase 3 at a predetermined position and a connection opening 4a formed in the intake passage 4 at a position on the upstream side of the compressor 12 of the supercharger 2. More specifically, the breather pipe 7 is constituted by a double pipe including a cylindrical inner pipe 8 that connects the second opening 3b of the crankcase 3 and the connection opening 4a of the intake passage 4, and a cylindrical outer pipe 9 that is arranged around the inner pipe 8 with a predetermined spacing held therebetween and that defines an enclosed space 10 between the inner pipe 8 and the outer pipe 9. A spacer (not illustrated) is disposed between the inner pipe 8 and the outer pipe 9 such that the inner pipe 8 and the outer pipe 9 are constituted to be immovable relative to each other in a radial direction with the aid of the spacer.

A communication passage 15 communicating the intake manifold 5 is connected to the breather pipe 7. More specifically, the communication passage 15 is disposed to connect a connection opening 9a formed in an outer peripheral surface of the outer pipe 9 of the breather pipe 7 at a predetermined position and a second connection opening 5b formed in the intake manifold 5 at a predetermined position closer to the throttle valve 14, thus communicating the enclosed space 10 in the breather pipe 7 and the intake manifold 5 with each other.

An intake pressure sensor 21 (intake pressure detection unit) for detecting pressure of the intake air in the intake manifold 5 (hereinafter referred to as "intake pressure PBA") is attached to the intake manifold 5. An outer-pipe pressure sensor 22 (breather outer-pipe pressure detection unit) for detecting pressure in the enclosed space 10 between the inner pipe 8 and the outer pipe 9 (hereinafter referred to as "breather outer-pipe pressure PDA") is attached to the breather pipe 7. In addition, a water temperature sensor 23 for detecting a temperature of cooling water in the engine 1 (hereinafter referred to as an "engine water temperature TW") is attached to the engine main body, and an atmospheric pressure sensor 24 for detecting atmospheric pressure PA is attached to the vehicle.

Figure 2:
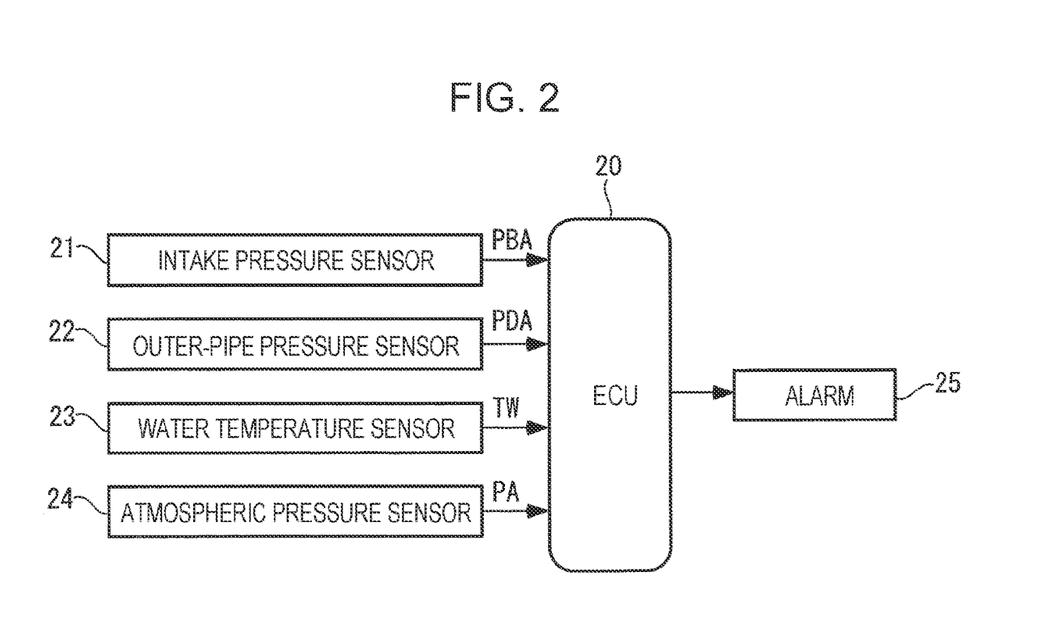
FIG. 2 is a block diagram illustrating the failure determination device for the internal combustion engine.

FIG. 2 is a block diagram illustrating the failure determination device. An ECU 20 illustrated in FIG. 2 is constituted by a microcomputer including an I/O interface, a CPU, a RAM, a ROM (all not illustrated), and so on. Detection signals from the above-mentioned various sensors 21 to 24 are input to the CPU after having been A/D-converted and shaped in the I/O interface. The CPU judges an operation state of the engine 1 based on those input signals, and executes a process of determining a failure of the engine 1, specifically a failure caused by, for example, disconnection or damage of the breather pipe 7, in accordance with a program stored in the ROM. Furthermore, when the occurrence of the failure has been determined, a signal indicating the occurrence of the failure is sent from the ECU 20 to an alarm 25, whereby the occurrence of the failure is informed to a driver of the vehicle. In this embodiment, a determination threshold setting unit and a failure determination unit in the present disclosure are constituted by the ECU 20.

Figure 3A:
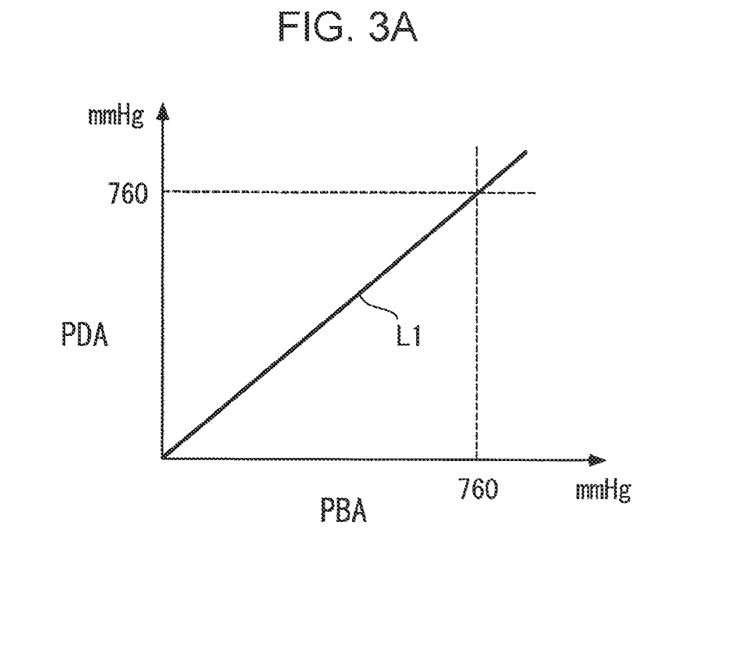
FIG. 3A represents a normal state in which a breather pipe is appropriately connected.

The principle of the failure determination based on a relation between the intake pressure PBA and the breather outer-pipe pressure PDA is now described with reference to FIG. 3. In the following description, it is assumed, unless otherwise specified, that the vehicle equipped with the engine 1 travels on a road where the altitude is relatively low and the atmosphere pressure PA is 760 mmHg (hereinafter referred to as a "plain"), and that the intake pressure PBA and the breather outer-pipe pressure PDA are expressed in terms of absolute pressure.

In a state illustrated in FIG. 1, namely a normal state in which the breather pipe 7 is appropriately connected to the second opening 3b of the crankcase 3 and the connection opening 4a of the intake passage 4, the communication passage 15 establishes the communication between the enclosed space 10 in the breather pipe 7 and the intake manifold 5 on the downstream side of the throttle valve 14 in the intake passage 4. Therefore, pressures at both end sides of the communication passage 15, namely the intake pressure PBA detected by the intake pressure sensor 21 and the breather outer-pipe pressure PDA detected by the outer-pipe pressure sensor 22, take substantially equal values. Accordingly, the breather outer-pipe pressure PDA changes together with a rise and a fall of the intake pressure PBA. In other words, the intake pressure PBA and the breather outer-pipe pressure PDA at the same detection timing are plotted on or around a first line L1 in FIG. 3A. The first line L1 depicted in FIG. 3A is expressed by a straight line sloping upward to the right, which is obtained by connecting points where the intake pressure PBA and the breather outer-pipe pressure PDA take the same value in a graph with a horizontal axis and a vertical axis representing the intake pressure PBA and the breather outer-pipe pressure PDA, respectively.

On the other hand, for example, if the breather pipe 7 is disconnected from the crankcase 3 or the intake passage 4, or if it is damaged with generation of a hole, the breather outer-pipe pressure PDA takes a value equal to or close to the atmospheric pressure PA. Thus, when the breather outer-pipe pressure PDA takes the same value as the atmospheric pressure PA due to the event that the breather pipe 7 is disconnected as mentioned above or is severely damaged with generation of a relatively large hole 8a as illustrated in FIG. 4A, for example, the intake pressure PBA and the breather outer-pipe pressure PDA at the same detection timing are plotted on a second line L2 in FIG. 3B. The second line L2 depicted in FIG. 3B is expressed by a horizontal straight line indicating that the breather outer-pipe pressure PDA takes the same value as the atmospheric pressure PA regardless of the value of the intake pressure PBA in the graph with the horizontal axis and the vertical axis defined similarly as in the case of the first line L1.

Figure 3B:
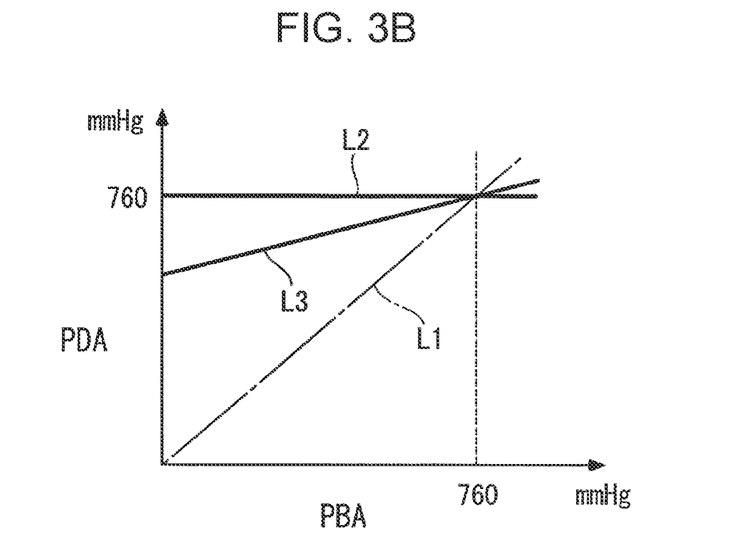
FIG. 3B represents a state in which the breather pipe is failed.
Figure 4A:
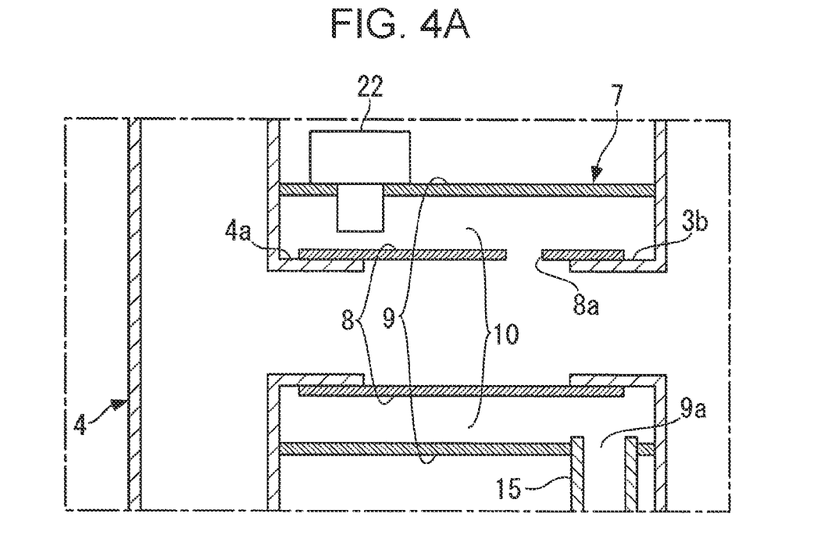
FIG. 4A represents a state in which the hole is large.
Figure 4B:
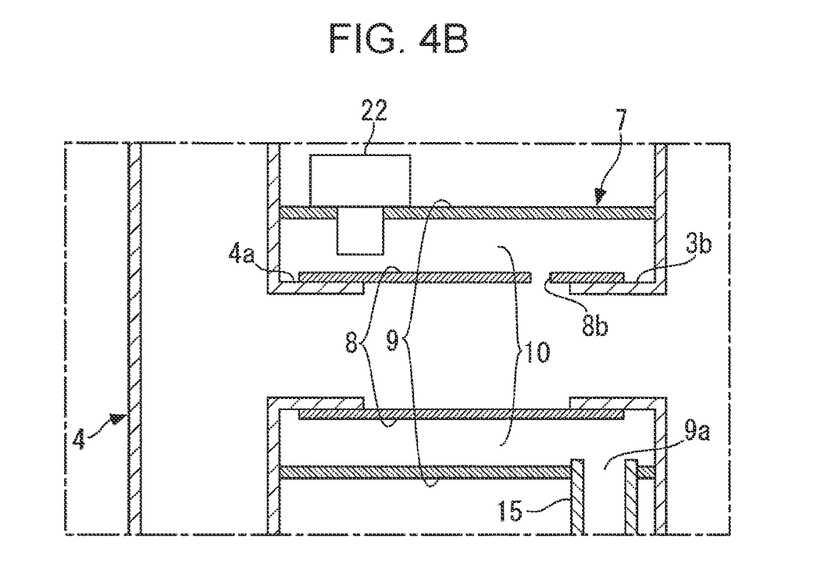
FIG. 4B represents a state in which the hole is small.

When the breather pipe 7 is slightly damaged, as illustrated in FIG. 4B, for example, with generation of a smaller hole 8b than the hole 8a illustrated in FIG. 4A, the intake pressure PBA and the breather outer-pipe pressure PDA at the same detection timing are plotted on or around a third line L3 that is positioned closer to the first line L1 corresponding to the normal state than the second line L2 in FIG. 3B. The third line L3 depicted in FIG. 3B is expressed by a straight line along which the breather outer-pipe pressure PDA changes depending on the intake pressure PBA, and which passes an intersection between the first line L1 and the second line L2 while sloping upward to the right.

Figure 5A:
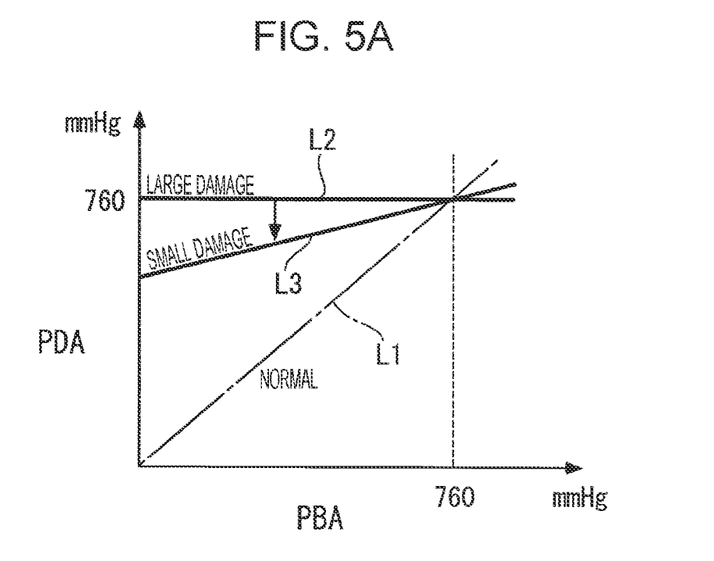
FIG. 5A represents change of the breather outer-pipe pressure depending on a degree of damage of the breather pipe.
Figure 5B:
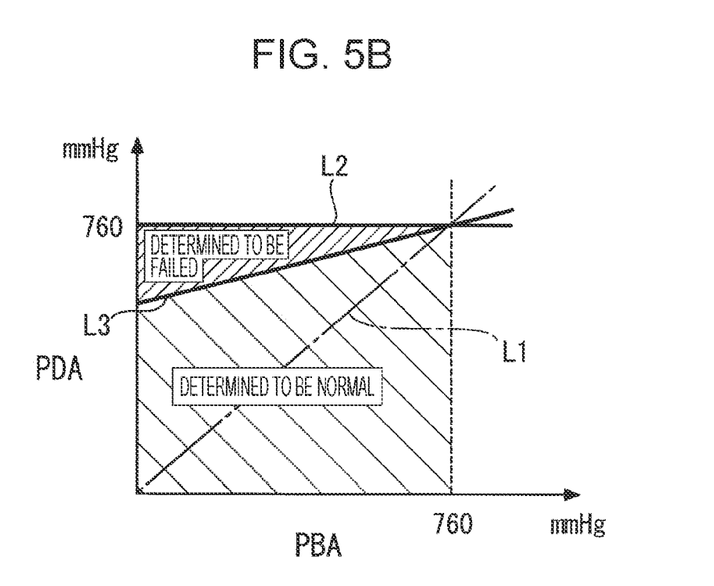

Thus, as illustrated in FIG. 5A, the second line L2 represents the relation between the intake pressure PBA and the breather outer-pipe pressure PDA when the disconnection of the breather pipe 7 or a relatively large damage of the breather pipe 7 has occurred. On the other hand, the third line L3 represents the relation between the intake pressure PBA and the breather outer-pipe pressure PDA when a relatively small damage of the breather pipe 7 has occurred. Accordingly, the third line L3 can be set as a straight line representing a threshold used to determine whether the failure of the breather pipe 7 has occurred. Stated in another way, as illustrated in FIG. 5B, a region positioned above the third line L3 and sandwiched between the second line L2 and the third line L3 is set as a "failure" indicating determination region where it can be determined that the breather pipe 7 is failed, while a region positioned below the third line L3 is set as a "normal" indicating determination region where it can be determined that the breather pipe 7 is normal.

In the case of using absolute pressure to express the intake pressure PBA and the breather outer-pipe pressure PDA, the following problem arises. When the vehicle equipped with the engine 1 travels on the plain, the absolute value of the atmospheric pressure PA is 760 mmHg. Therefore, whether the failure of the breather pipe 7 has occurred can be determined using a failure determination map illustrated in FIG. 6A, the map including the same first to third lines L1 to L3 as those in FIGS. 5A and 5B. However, when the vehicle equipped with the engine 1 travels on a road where the altitude is relatively high (hereinafter referred to as a "highland"), the absolute value of the atmospheric pressure PA is lower than 760 mmHg. Therefore, when the failure of the breather pipe 7 has occurred, the second line L2 and the third line L3 in FIG. 6A are displaced in a direction to decrease (downward on the drawing) by an amount corresponding to a reduction of the atmospheric pressure PA and become a lowered second line L2' and a lowered third line L3', respectively, as illustrated in FIG. 6B.

Figure 6A:
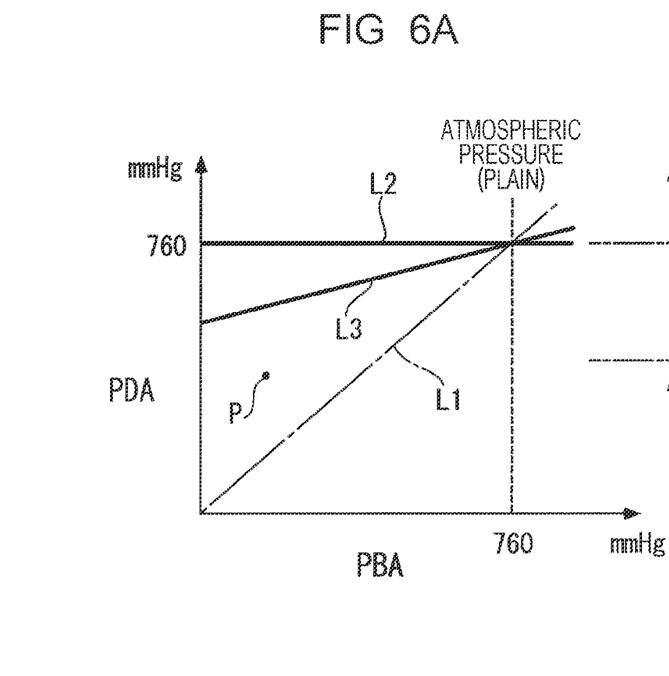
FIG. 6A represents the relation in the case of a low-altitude plain.
Figure 6B:
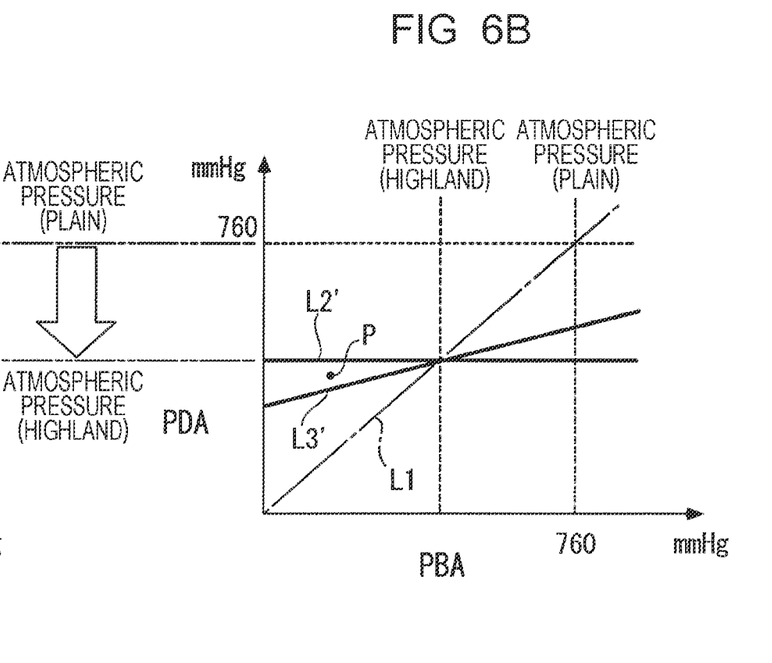
FIG. 6B represents the relation in the case of a high-altitude land.

In the above case, if the failure determination is performed using the map illustrated in FIG. 6A as it is, there is a possibility that false determination may occur. For example, when the intake pressure PBA and the breather outer-pipe pressure PDA are detected at a point P denoted in FIG. 6B, the breather pipe 7 is determined to be failed because the point P is positioned above the lowered third line L3' indicating the threshold. In the case of using the map illustrated in FIG. 6A, however, because the point P is positioned below the lowered third line L3', the breather pipe 7 that should be in fact determined to be failed is falsely determined to be normal.

To avoid the above-described problem, an intake gauge pressure PBGA and a breather outer-pipe gauge pressure PDGA expressed in terms of gauge pressure with the atmospheric pressure PA being a reference are preferably used instead of the intake pressure PBA and the breather outer-pipe pressure PDA in terms of absolute pressure. The intake gauge pressure PBGA and the breather outer-pipe gauge pressure PDGA are expressed as follows.

PBGA=PBA−PA

PDGA=PDA−PA

Figure 7:
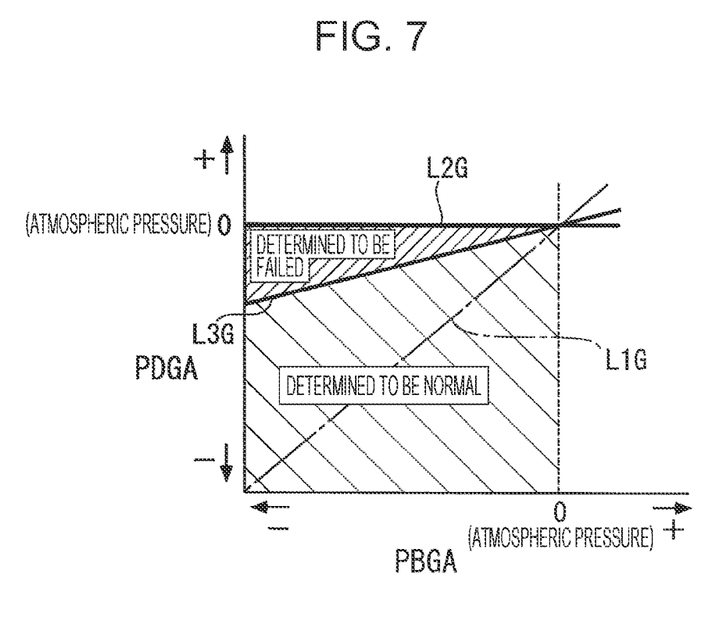
FIG. 7 represents a failure determination map based on a relation between intake gauge pressure and breather outer-pipe gauge pressure.

FIG. 7 corresponds to FIG. 5B and represents a map used in executing the failure determination of the breather pipe 7 based on the intake gauge pressure PBGA and the breather outer-pipe gauge pressure PDGA. On this failure determination map, a first gauge line L1G, a second gauge line L2G, and a third gauge line L3G corresponding respectively to the first line L1, the second line L2, and the third line L3 in FIG. 5B are indicated as illustrated in FIG. 7. Furthermore, in the failure determination map of FIG. 7, as in the map of FIG. 5B, a region sandwiched between the second gauge line L2G and the third gauge line L3G can be set as the "failure" indicating determination region, while a region positioned below the third gauge line L3G can be set as the "normal" indicating determination region. By using that failure determination map, even when the atmospheric pressure PA changes, the failure of the breather pipe 7 can be appropriately determined without being affected by the change of the atmospheric pressure PA.

Figure 8A:
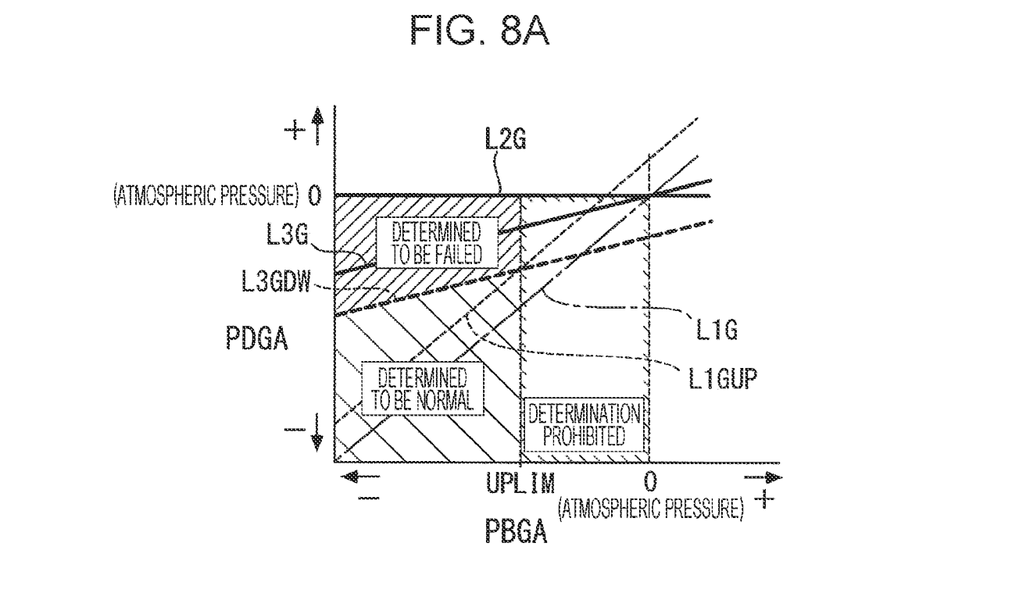
FIG. 8A represents a failure determination map obtained by setting a determination prohibited region in the failure determination map of FIG. 7.

A failure determination map illustrated in FIG. 8A can also be used instead. This failure determination map makes it possible to prevent false determination that may be caused by variations in detection of the intake gauge pressure PBGA and the breather outer-pipe gauge pressure PDGA. More specifically, in this failure determination map, a determination prohibition region is set in addition to the above-described map of FIG. 7, and the "failure" indicating determination region is enlarged in a direction in which the breather outer-pipe gauge pressure PDGA decreases (downward in FIG. 8A).

Figure 8B:
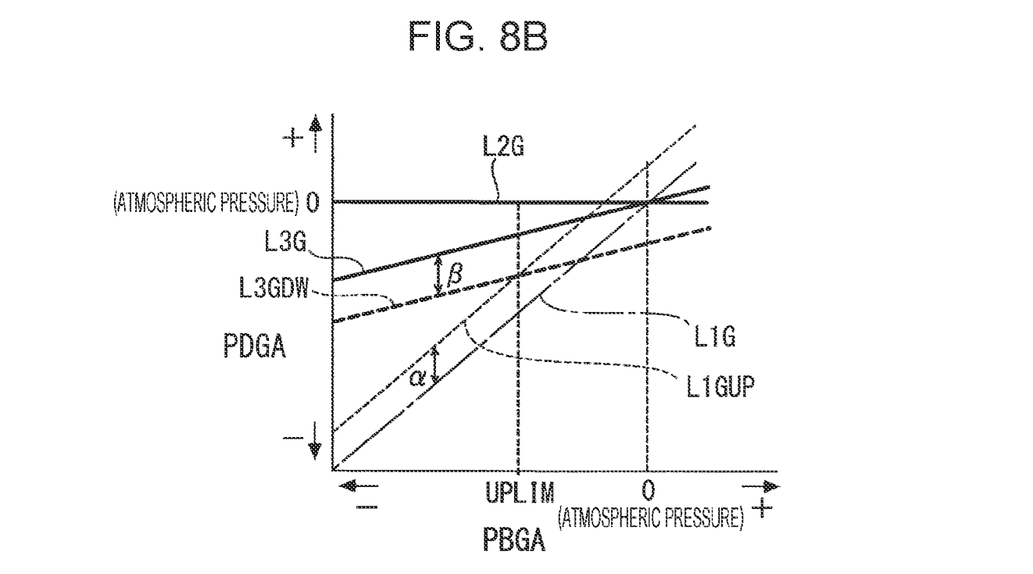
FIG. 8B is an explanatory view representing a method of preparing the failure determination map of FIG. 8A.

A method of preparing the failure determination map of FIG. 8A is now described with reference to FIG. 8B. As seen from FIG. 8B, an upper limit line L1GUP representing an upper limit of variation of the first gauge line L1G in the normal state and a lower limit line L3GDW representing a lower limit of variation of the third gauge line L3G in the failed state are indicated in FIG. 8B in addition to the first gauge line L1G, the second gauge line L2G, and the third gauge line L3G in FIG. 7. The upper limit line L1GUP is set by adding a maximum variation width a to the first gauge line L1G. On the other hand, the lower limit line L3GDW is set by subtracting a maximum variation width p from the third gauge line L3G.

The intake gauge pressure PBGA at a point at which the upper limit line L1GUP exceeds the lower limit line L3GDW is set as an upper limit value UPLIM of the intake gauge pressure in the failure determination. Stated in another way, when the intake gauge pressure PBGA exceeds the upper limit value UPLIM, a possibility of the false determination caused by variations in detection of the intake gauge pressure PBGA and the breather outer-pipe gauge pressure PDGA is high, and hence the failure determination is prohibited to avoid such a possibility. Thus, as illustrated in FIG. 8A, the region where the intake gauge pressure PBGA exceeds the upper limit value UPLIM is set as the determination prohibition region. Moreover, a region positioned above the lower limit line L3GDW and sandwiched between the lower limit line L3GDW and the second gauge line L2G except for the above-described determination prohibition region is set as the "failure" indicating determination region.

Figure 9:
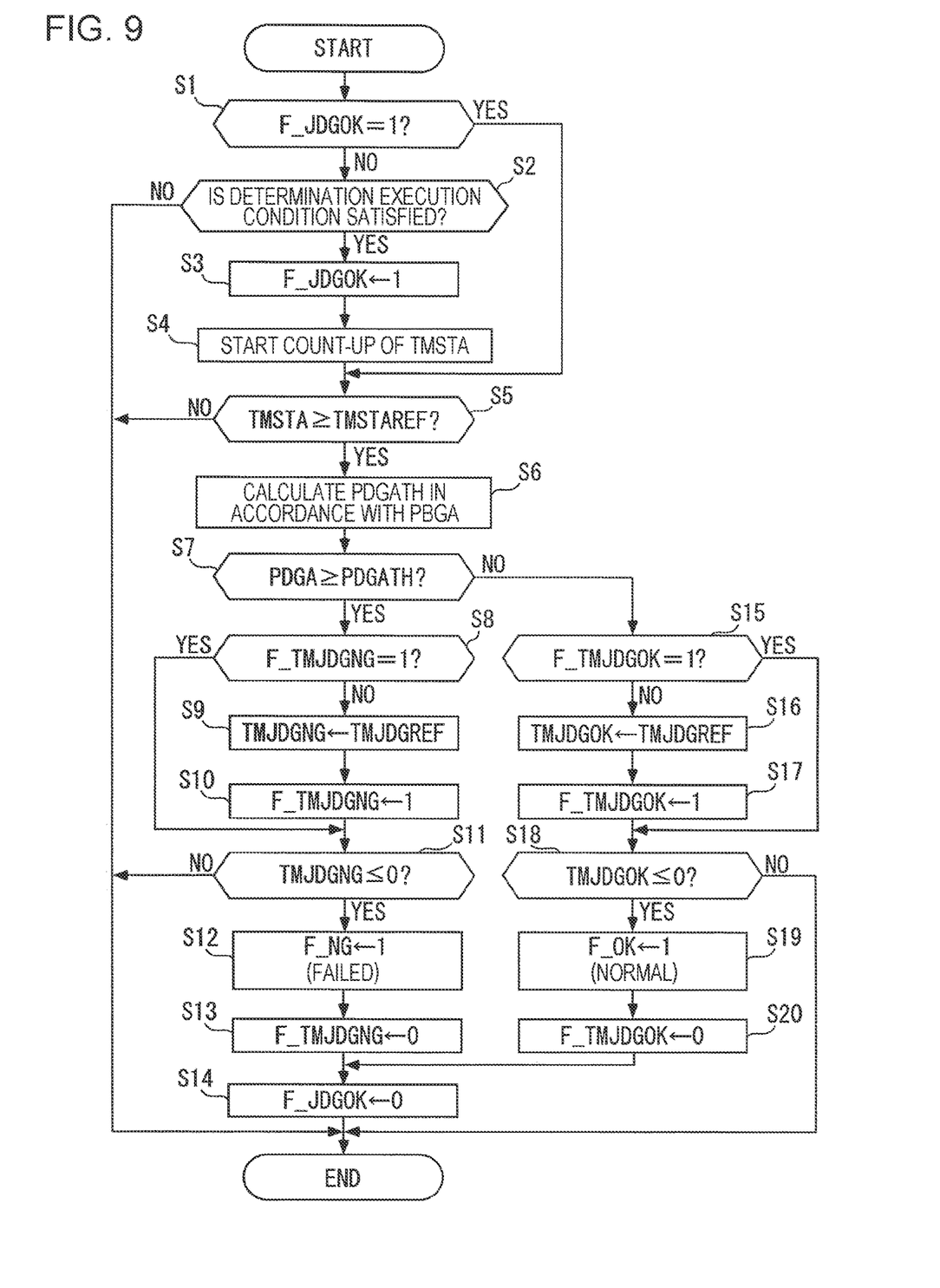
FIG. 9 is a flowchart illustrating a failure determination process.

A process of determining the failure of the breather pipe 7 will be described below with reference to FIG. 9. This process is repeatedly executed in the ECU 20 at a predetermined period.

In this failure determination process, it is first judged in step 1 (denoted by "S1" in the drawing; this notation is similarly applied to the following description) whether the determination execution condition satisfaction flag F_JDGOK is "1". The determination execution condition satisfaction flag F_JDGOK is set to "1" when later-described conditions for executing the failure determination are satisfied, and it is reset to "0" after the occurrence or not of the failure has been determined with the failure determination process. If a judgement result in step 1 is NO, the process goes to step 2 and judges whether determination execution conditions are satisfied. If a judgement result in step 2 is NO and the determination execution conditions are not satisfied, the process is ended at once. On the other hand, if the judgement result in step 2 is YES and the determination execution conditions are satisfied, the determination execution condition satisfaction flag F_JDGOK is set to "1" (step 3) to indicate that the determination execution conditions are satisfied. In addition, count-up of the timer value TMSTA of the stabilization wait timer, which is a count-up timer, is started (step 4) to wait for the lapse of a time required for stably executing the determination in the actual process from the satisfaction of the determination execution conditions. Thus, the timer value TMSTA is counted up from a value 0.

Whether the determination execution conditions are satisfied is judged in the above-described step 2 based on, for example, the engine water temperature TW, the intake gauge pressure PBGA, and change amounts of those parameters. More specifically, the satisfaction of the determination execution conditions is judged when the engine water temperature TW is higher than or equal to a predetermined temperature TWREF (TW≥TWREF), the intake gauge pressure PBGA is lower than or equal to the above-described upper limit value UPLIM in FIG. 8A (PBGA≤UPLIM), and a change amount ΔPBGA of the intake gauge pressure PBGA, for example, a difference between a previous value and a current value of the intake gauge pressure PBGA, is smaller than or equal to a predetermined value ΔPBGAREF (ΔPBGA≤ΔPBGAREF). When even any one of the above three conditions is not satisfied, it is judged that the determination execution conditions are not satisfied.

If the judgement result in step 1 is YES and F_JDGOK=1 is held, namely if the determination execution conditions have been satisfied in a previous loop of the process and the determination execution condition satisfaction flag F_JDGOK has already been set to "1" with the execution of step 3, the process skips steps 2 to 4 and goes to step 5. Thus, the count-up of the timer value TMSTA of the stabilization wait timer is continued.

In step 5, whether the timer value TMSTA of the stabilization wait timer indicates the lapse of a predetermined stabilization wait time TMSTAREF (for example, 2 sec) is judged. If a judgement result in step 5 is NO, the process is ended at once. On the other hand, if the judgement result in step 5 is YES, the process goes to step 6 upon judging that the time required for stably executing the failure determination has sufficiently lapsed.

In step 6, a threshold PDGATH of the breather outer-pipe gauge pressure is calculated in accordance with the intake gauge pressure PBGA. The threshold PDGATH is calculated using the above-described lower limit line L3GDW of the third gauge line L3G illustrated in FIG. 8A.

Then, whether the breather outer-pipe gauge pressure PDGA is higher than or equal to the threshold PDGATH having been calculated in step 6 (PDGA PDGATH) is judged in step 7 subsequent to step 6. If a judgement result in step 7 is YES, namely if the breather outer-pipe gauge pressure PDGA falls within the "failure" indicating determination region illustrated in FIG. 8A, the process goes to step 8 and judges whether a flag F_TMJDGNG indicating the end of setting of a time required to determine the failed state is "1". If a judgement result in step 8 is NO, the timer value TMJDGNG of the timer counting the time required to determine the failed state, which is a count-down timer, is set to a predetermined time TMJDGREF (for example, 2 sec) required for the determination (step 9), and the flag F_TMJDGNG indicating the end of setting of the time required to determine the failed state is set to "1" to indicate the setting of the relevant flag (step 10). Thus, in a next loop of the process, the judgement result in step 8 becomes YES and the process goes to step 11 after skipping the above-described steps 9 and 10.

When the above-described determination execution conditions are no longer satisfied (step 2: NO) after the timer value TMJDGNG of the timer counting the time required to determine the failed state has started the count-down upon the execution of the above-described step 9, the relevant timer is set to be temporarily stopped with an interrupt process and the determination execution condition satisfaction flag F_JDGOK is reset to "0". Furthermore, the count-down of the timer value TMJDGNG of the timer counting the time required to determine the failed state is set to be resumed when, after the timer value TMJDGNG has been temporarily stopped, the determination execution conditions are satisfied (step 2: YES) and the timer value TMSTA of the stabilization wait timer becomes equal to or longer than the stabilization wait time TMSTAREF (step 5: YES).

In step 11, it is judged whether the timer value TMJDGNG of the timer counting the time required to determine the failed state, set in the above-described step 9, has reduced to 0 or below. If a judgement result in step 11 is NO, the process is ended at once. On the other hand, if the judgement result in step 11 is YES and the time required to determine the failed state has lapsed, the breather pipe 7 is determined to be failed and a failure flag F_NG is set to "1" to indicate the failure of the breather pipe 7 (step 12).

Thereafter, the flag F_TMJDGNG indicating the end of setting of the time required to determine the failed state is reset to "0" (step 13) and the determination execution condition satisfaction flag F_JDGOK is reset to "0" (step 14), whereby the process is ended.

Meanwhile, if the judgement result in step 7 is NO and the breather outer-pipe gauge pressure PDGA is lower than the threshold PDGATH, namely if the breather outer-pipe gauge pressure PDGA falls within the "normal" indicating determination region illustrated in FIG. 8A, the process goes to step 15 and judges whether a flag F_TMJDGOK indicating the end of setting of a time required to determine the normal state is "1". If a judgement result in step 15 is NO, a timer value TMJDGOK of a timer counting a time required to determine the normal state, which is a count-down timer, is set to the predetermined time TMJDGREF (for example, 2 sec) required for the determination (step 16), and the flag F_TMJDGOK indicating the end of setting of the time required to determine the normal state is set to "1" to indicate the setting of the relevant flat (step 17). Thus, in a next loop of the process, the judgement result in step 15 becomes YES and the process goes to step 18 after skipping the above-described steps 16 and 17.

Count-down of the timer value TMJDGOK of the timer counting the time required to determine the normal state is set to be temporarily stopped and then resumed in accordance with similar conditions to those for the above-described count-down of the timer value TMJDGNG of the timer counting the time required to determine the failed state.

In step 18, it is judged whether the timer value TMJDGOK of the timer counting the time required to determine the normal state, set in the above-described step 16, has reduced to 0 or below. If a judgement result in step 18 is NO, the process is ended at once. On the other hand, if the judgement result in step 18 is YES and the time required to determine the normal state has lapsed, the breather pipe 7 is determined to be normal and a normal-state flag F_OK is set to "1" to indicate that the breather pipe 7 is normal (step 19).

Thereafter, the flag F_TMJDGOK indicating the end of setting of the time required to determine the normal state is reset to "0" (step 20) and the above-described step 14 is executed, whereby the process is ended.

Figure 10A:
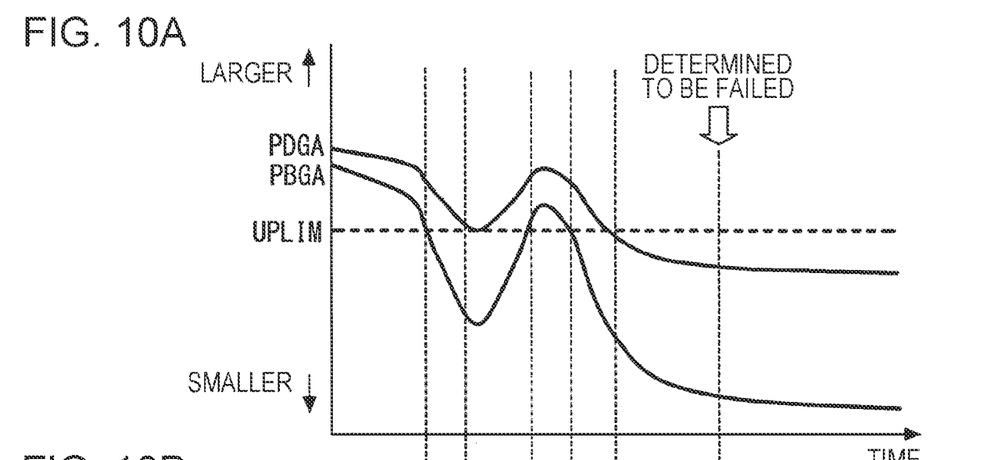
FIG. 10A represents an example of progress of the intake gauge pressure PBGA and the breather outer-pipe gauge pressure PDGA.
Figure 10B:
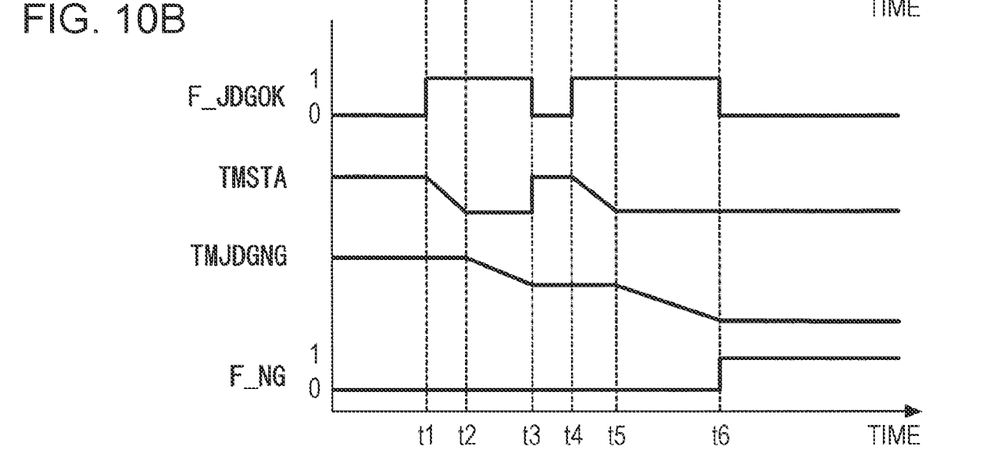
FIG. 10B is a timing chart of a determination execution condition satisfaction flag F_JDGOK, a timer value TMSTA of a stabilization wait timer, a timer value TMJDGNG of a timer counting a time required to determine the failed state, and a flag F_NG indicating a determination result of failure, those flags and values changing with the progress illustrated in FIG. 10A.

The operation according to the above-described failure determination process will be described below with reference to FIGS. 10A and 10B. FIG. 10A represents an example of progress of the intake gauge pressure PBGA and the breather outer-pipe gauge pressure PDGA, and FIG. 10B is a timing chart of the determination execution condition satisfaction flag F_JDGOK, the timer value TMSTA of the stabilization wait timer, the timer value TMJDGNG of the timer counting the time required to determine the failed state, and the flag F_NG indicating a determination result of failure, those flags and values changing with the progress illustrated in FIG. 10A.

As illustrated in FIG. 10A, before time t1, because the intake gauge pressure PBGA is higher than the upper limit value UPLIM that specifies one of the failure determination execution conditions, the determination execution conditions are not satisfied (step 2: NO). Therefore, the determination execution condition satisfaction flag F_JDGOK is held at "0" as illustrated in FIG. 10B.

At time t1, because the intake gauge pressure PBGA becomes equal to or lower than the upper limit value UPLIM (PBGA≤UPLIM) and the other determination execution conditions (related to the water temperature TW and the change amount ΔPBGA of the intake gauge pressure) are satisfied (TW≥TWREF and ΔPBGA≤ΔPBGAREF), the determination execution condition satisfaction flag F_JDGOK is set to "1" (step 3). Therefore, the count-up of the timer value TMSTA of the stabilization wait timer is started (step 4). Then, when the timer value TMSTA indicates the lapse of the predetermined stabilization wait time TMSTAREF (step 5: YES), namely at time t2, the predetermined time TMJDGREF required for the determination is set as the timer value TMJDGNG of the timer counting the time required to determine the failed state (step 9). Hence the count-down of the timer value TMJDGNG is started.

Thereafter, at time t3, when the intake gauge pressure PBGA exceeds the upper limit value UPLIM of the intake gauge pressure (PBGA>UPLIM) and the determination execution conditions are no longer satisfied, the determination execution condition satisfaction flag F_JDGOK is reset to "0". Accordingly, the timer value TMSTA of the stabilization wait timer is reset to a value 0 and the count-down of the timer value TMJDGNG of the timer counting the time required to determine the failed state is temporarily stopped.

Then, at time t4, when the intake gauge pressure PBGA becomes again equal to or lower than the upper limit value UPLIM (PBGA≤UPLIM), the determination execution condition satisfaction flag F_JDGOK is set to "1" (step 3). Therefore, the count-up of the timer value TMSTA of the stabilization wait timer is started again (step 4). Then, at time t5, when the timer value TMSTA indicates the lapse of the predetermined stabilization wait time TMSTAREF (step 5: YES), the count-down of the timer value TMJDGNG of the timer counting the time required to determine the failed state is resumed from the temporarily stopped state.

Thereafter, at time t6, when the timer value TMJDGNG of the timer counting the time required to determine the failed state becomes equal to a value 0 or below (step 11: YES), the flag F_NG indicating the determination result of failure is set to "1" (step 12) and the breather pipe 7 is determined to be failed.

According to this embodiment, as described above in detail, the breather pipe 7 constituted by the double pipe is connected between the crankcase 3 and the intake passage 4 at the position on the upstream side of the compressor 12 of the supercharger 2, and the enclosed space 10 in the breather pipe 7 and the intake manifold 5 are communicated with each other by the communication passage 15. The failure of the breather pipe 7 can be appropriately and quickly determined by comparing the breather outer-pipe gauge pressure PDGA with the threshold PDGATH that is set in accordance with the pressure in the intake manifold 5, namely the intake gauge pressure PBGA.

Furthermore, according to this embodiment, since the failure determination of the breather pipe 7 is executed when the detected intake gauge pressure PBGA is lower than or equal to the upper limit value UPLIM, false determination can be effectively prevented which may occur due to variations in detection of the intake gauge pressure PBGA and the breather outer-pipe gauge pressure PDGA. Moreover, because of using the intake gauge pressure PBGA and the breather outer-pipe gauge pressure PDGA, which are pressures on the basis of the atmospheric pressure PA, in the failure determination of the breather pipe 7, even if the atmospheric PA changes, for example, when the vehicle travels on a road with different altitudes, the failure determination of the breather pipe 7 can be appropriately performed without being affected by the change of the atmospheric pressure.

The present disclosure is not limited to the above-described embodiment and can be implemented in various embodiments. For example, while, in the above-described embodiment, the failure determination of the breather pipe 7 is performed using the intake gauge pressure PBGA and the breather outer-pipe gauge pressure PDGA on the basis of the atmospheric pressure PA, the present disclosure is not limited to such a case and the failure determination may also be performed using the intake pressure PBA, the breather outer-pipe pressure PDA, and a threshold that is calculated based on the third line L3 illustrated in FIG. 5B. While the above-described embodiment relates to the case of determining the failure of the breather pipe 7 disposed in the engine 1 equipped with the supercharger 2, the present disclosure may also be applied to the failure determination of a breather pipe that is disposed in an engine not equipped with a supercharger, or of another type of pipe.

Furthermore, a check valve (not illustrated) may be disposed at the second connection opening 5b, namely at a junction between the communication passage 15 and the intake manifold 5. With the check valve disposed at that junction, negative pressure generated in the intake manifold 5 can be avoided from acting on sealing members for the communication passage 15 and the breather pipe 7. It is hence possible to suppress the component performance demanded for the sealing members, to use relatively inexpensive sealing members, and to reduce the cost.

While, in the above-described embodiment, the communication passage 15 is connected between the enclosed space 10 in the breather pipe 7 and the intake manifold 5, the present disclosure is not limited to such a case and the communication passage 15 connected to the enclosed space 10 is just required to be positioned in the intake passage 4 on the downstream side of the supercharger 2 (the compressor 12). In other words, the communication passage 15 may be connected to the intake passage 4 at a position on the upstream side of the throttle valve 14. Also in the above-mentioned case, the failure of the breather pipe 7 can be appropriately and quickly determined.

A passage area (cross-sectional area) of the communication passage 15 is set to be smaller than a predetermined size in accordance with which the occurrence of the failure of the breather pipe 7 is to be determined in case that the breather pipe 7 is damaged with generation of a hole. Therefore, when a hole with a size larger than the predetermined size is generated in the breather pipe 7, each of the breather outer-pipe pressure PDA and the breather outer-pipe gauge pressure PDGA causes a larger pressure difference relative to the pressure in the normal state. Accordingly, the failure of the breather pipe 7 can be detected with higher accuracy based on the larger pressure difference.

The detailed structures and so on of the engine 1 and the breather pipe 7, described above in the embodiment, are intended to be merely illustrative and can be modified as appropriate within the scope of the gist of the present disclosure. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A failure determination device for an internal combustion engine equipped with a supercharger, the failure determination device determining a failure of a breather pipe that is connected between a crankcase and an intake passage at a position on an upstream side of the supercharger to communicate the crankcase and the intake passage with each other, wherein the breather pipe is constituted by a double pipe including an inner pipe that communicates the crankcase and the intake passage with each other, and an outer pipe that is arranged around the inner pipe with a predetermined spacing held therebetween to encircle the inner pipe and that defines an enclosed space between the inner pipe and the outer pipe, and the failure determination device comprises:
a communication passage that communicates the enclosed space in the breather pipe and a portion of the intake passage located on a downstream side of the supercharger with each other;

a breather outer-pipe pressure detector that detects, as breather outer-pipe pressure, pressure in the enclosed space in the breather pipe;

an intake pressure detector that detects, as intake pressure, pressure in the intake passage on the downstream side of the supercharger;

a determination threshold setting unit that sets, in accordance with the detected intake pressure, a determination threshold used to determine whether a failure has occurred; and a failure determination unit that determines that the breather pipe is failed, when the detected breather outer-pipe pressure is higher than or equal to the determination threshold.

2. The failure determination device for the internal combustion engine according to claim 1, wherein the failure determination unit executes failure determination of the breather pipe when the detected intake pressure is lower than or equal to a predetermined value.

3. The failure determination device for the internal combustion engine according to claim 1, further comprising an atmospheric pressure detector that detects atmospheric pressure, wherein the determination threshold setting unit sets the determination threshold in accordance with a relation between the detected intake pressure and the detected atmospheric pressure.

4. The failure determination device for the internal combustion engine according to claim 3, wherein the determination threshold setting unit sets, as a gauge-pressure determination threshold, the determination threshold in accordance with intake gauge pressure resulting from subtracting the detected atmospheric pressure from the detected intake pressure, and the failure determination unit determines that the breather pipe is failed, when breather outer-pipe gauge pressure resulting from subtracting the detected atmospheric pressure from the breather outer-pipe pressure is higher than or equal to the gauge-pressure determination threshold.

5. A failure determination device for an internal combustion engine, the failure determination device determining a failure of a predetermined pipe disposed in the internal combustion engine and communicating a first location and a second location that are to be held in communication with each other, wherein the pipe is constituted by a double pipe including an inner pipe that communicates the first location and the second location with each other, and an outer pipe that is arranged around the inner pipe with a predetermined spacing held therebetween to encircle the inner pipe and that defines an enclosed space between the inner pipe and the outer pipe, and the failure determination device comprises:

a communication passage that communicates the enclosed space in the pipe and a portion of an intake passage located on a downstream side of a throttle valve with each other;

an outer-pipe pressure detector that detects, as outer pipe pressure, pressure in the enclosed space in the pipe;

an intake pressure detector that detects, as intake pressure, pressure in the intake passage on the downstream side of the throttle valve;

a determination threshold setting unit that sets, in accordance with the detected intake pressure, a determination threshold used to determine whether a failure has occurred; and a failure determination unit that determines that the pipe is failed, when the detected outer pipe pressure is higher than or equal to the determination threshold.

6. The failure determination device for the internal combustion engine according to claim 1, wherein the communication passage communicates the enclosed space in the breather pipe and a portion of the intake passage located on a downstream side of a throttle valve with each other, and the intake pressure detector detects, as the intake pressure, pressure in the intake passage on the downstream side of the throttle valve.

7. The failure determination device for the internal combustion engine according to claim 6, wherein a check valve is disposed at a junction between the communication passage and the portion of the intake passage located on the downstream side of the throttle valve.

8. The failure determination device for the internal combustion engine according to claim 1, wherein a sectional area of the communication passage is set to be smaller than a predetermined size of a hole caused in the breather pipe in accordance with which occurrence of the failure is to be determined.

9. The failure determination device for the internal combustion engine according to claim 1, wherein the determination threshold is a function of the detected intake pressure.

10. The failure determination device for the internal combustion engine according to claim 2, wherein the failure determination unit prohibits execution of the failure determination of the breather pipe when the detected intake pressure is higher than the predetermined value.

11. The failure determination device for the internal combustion engine according to claim 1, wherein the breather outer-pipe pressure is increased by the failure of the breather pipe.

12. A failure determination method of an internal combustion engine equipped with a supercharger, the failure determination method determining a failure of a breather pipe that is connected between a crankcase and an intake passage at a position on an upstream side of the supercharger to communicate the crankcase and the intake passage with each other, wherein the breather pipe is constituted by a double pipe including an inner pipe that communicates the crankcase and the intake passage with each other, and an outer pipe that is arranged around the inner pipe with a predetermined spacing held therebetween to encircle the inner pipe and that defines an enclosed space between the inner pipe and the outer pipe, and the internal combustion engine comprises a communication passage that communicates the enclosed space in the breather pipe and a portion of the intake passage located on a downstream side of the supercharger with each other, the method comprising steps of:

detecting by a detector, as breather outer-pipe pressure, pressure in the enclosed space in the breather pipe;

detecting by a detector, as intake pressure, pressure in the intake passage on the downstream side of the supercharger;

setting by a computer, in accordance with the detected intake pressure, a determination threshold used to determine whether a failure has occurred; and determining by a computer that the breather pipe is failed, when the detected breather outer-pipe pressure is higher than or equal to the determination threshold.

* * * * *